A. DOUGLAS.

Folding-Guide for Sewing-Machines.

No. 5,180. Reissued Dec. 10, 1872.

Witnesses:

Wm S. Packer

Edwin A. Booth

Alex Douglas

Inventor.

UNITED STATES PATENT OFFICE.

ALEXANDER DOUGLAS, OF NEW YORK, N. Y., ASSIGNOR, BY MESNE ASSIGNMENTS, TO GEORGE H. WOOSTER.

IMPROVEMENT IN FOLDING-GUIDES FOR SEWING-MACHINES

Specification forming part of Letters Patent No. 21,659, dated October 5, 1858; extended seven years; Reissue No. 5,180, dated December 10, 1872.

*To all whom it may concern:*

Be it known that I, ALEXANDER DOUGLAS, of the city, county, and State of New York, have invented a new and Improved Folding-Guide for folding and turning in the edges of a piece of cloth or other material for binding, or for other similar purposes, preparatory to sewing; and I do hereby declare that the following is a full, clear, and exact description of the same, reference being had to the accompanying drawing forming part of this specification, in which—

Figure 1:
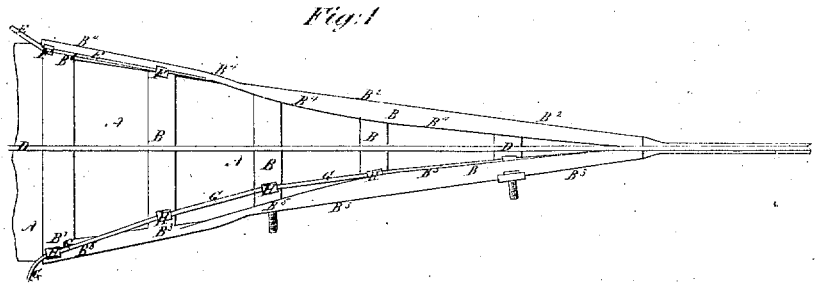
Figure 8:
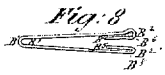
Figure 2:
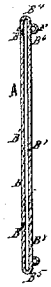
Figure 9:
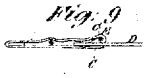

Figure 1 is a view of my folding-guide so formed as to fold the material simultaneously upon the center and upon both edges. Figs. 2, 3, 4, 5, 6, and 7 are transverse sections of the said guide at the points where the strengthening transverse pieces B B, &c., are situated, as shown in Fig. 1. Fig. 8 is a cross-section of a binder which is of the same sectional form at both ends. Fig. 9 is a cross-section of a binding as it issues from the said guide.

Similar letters of reference indicate corresponding parts in the several figures.

To enable others to make and use my invention, I will proceed to describe its construction and operation.

The simplest method of constructing my improved guide is to take a plate of metal, A, of a width somewhat greater than that of the strip or piece of cloth or other material which is to be folded, and have the edges of such plate turned toward each other the whole length of the plate. The plate having its edges thus turned or bent has the bent edges turned again on the lines $B^2$ $B^3$, the turn commencing at a short distance from the end shown in Figs. 1 and 2, and increasing toward the other end, as shown in Figs. 3, 4, 5, 6, and 7. If it is desired to fold the material in the center, the plate may be then again bent at or near the middle, commencing at the end shown in Fig. 2, and gradually increasing all the way along to the other end, as shown in section in Figs. 2, 3, 4, 5, 6, and 7. This gives the edges of the said plate the curved and twisted appearance shown in Fig. 1. This piece of metal A is the guiding-surface of the folder. Its shape and folds determine the number and character of the folds in the material to be guided. The plate A may be strengthened by transverse pieces B B, which are secured to its edges, and lie as close as practicable to the concave side of the plate, just leaving space enough for the cloth to pass between them and the plate A. By inserting a strip of cloth or other material into the guide at the end shown in Fig. 2, and drawing it toward the other end, it will follow the configuration of the surface of the exterior plate A, and will be folded into a shape indicated by the turnings of said guiding-surface. Small projections, provided with holes for the passage of cord, may be arranged, as shown at Fig. 1, F and H, so as to guide a cord or cords under the turned edge or edges of the material.

To apply the binding to the edge of cloth or other material, such edge is placed in such relation to the guide as is shown in the line D in Figs. 1 to 9, and is drawn along at the same time that the binding is drawn along, either by the feed of a sewing-machine or other device. The binding is stitched at the proper places for holding the edges and the cord, if a cord is used. The ordinary line of stitching is indicated in Fig. 9 by the line C C.

If the guide is used in combination with a sewing-machine, as will ordinarily be the case, it will be attached to the cloth-plate in such a position as to discharge the folded material under the needle and in the line and direction of the feed.

Figure 3:
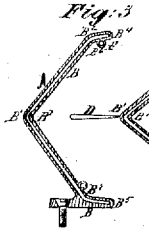
Figure 4:
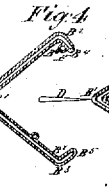
Figure 5:
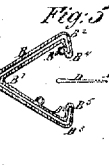
Figure 6:
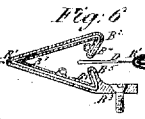
Figure 7:
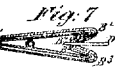

In Figs. 1, 3, and 6 are shown screws for fastening the guide, there represented, to the cloth-plate. The direction of the screws indicate what will be, in that case, the position of the guide. In Fig. 8 I have shown a section of another form of binder for the same purpose and productive of the same result, but which is of the same sectional form throughout, and is not gradually folded upon itself in converging lines, as described and shown in the case of the first-mentioned guide.

It is manifest from the above description that if the guide be not turned or folded together through the center, or if one of the edges be not folded over, or if the strip of material be not wide enough to receive the fold on both edges, in the first case the material will be folded only upon each of the edges, and in the last cases it will be folded near the center and upon one edge only.

The great advantage of my guide is that by reason of the folding of the edges it permits the use of raw-edged material without a selvage; another is that it combines cording with binding.

I do not claim guides for folding material through the center only, as those are described in Sweet's patent of 1853, Nichol's patent of 1856, McCurdy's patent of 1856, Singer's patent of 1856, and by others; nor do I claim guides for turning or hemming one edge of a piece of cloth or other material, except when the guide is so shaped as also to simultaneously either fold the material in the center or upon the other edge; but What I do claim is as follows:

1. A folding-guide, the guiding-surface of which is turned or folded at each edge, so as simultaneously to fold the material on each edge, substantially as described.

2. A folding-guide, the guiding-surface of which is turned or folded so as simultaneously to fold the guided material at or near the center, and upon one or both edges, substantially as described.

3. A folding-guide, the guiding surface of which is gradually turned or folded at each edge so as simultaneously to fold the material on each edge, substantially as described.

4. A folding-guide, the guiding-surface of which is gradually turned or folded so as simultaneously to fold the material at or near the center and upon one or both edges, substantially as described.

5. A folding-guide, substantially as described, provided with means, substantially as described, for attaching the same to and combining it with a sewing-machine.

6. A folding-guide, substantially such as described, provided with a cord-guide, as and for the purposes set forth.

ALEX. DOUGLAS.

Witnesses:
EDWIN A. BOOTH,
WM. S. PACKER